(12) United States Patent
Noda et al.

(10) Patent No.: US 7,327,657 B2
(45) Date of Patent: Feb. 5, 2008

(54) REPRODUCTION SIGNAL EVALUATION METHOD

(75) Inventors: Chosaku Noda, Kawasaki (JP); Yutaka Kashihara, Fuchu (JP); Yutaka Okamoto, Chofu (JP); Hideo Ando, Hino (JP); Koichi Hirayama, Ichikawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1 day.

(21) Appl. No.: 11/493,798

(22) Filed: Jul. 27, 2006

(65) Prior Publication Data
US 2006/0262688 A1 Nov. 23, 2006

Related U.S. Application Data

(62) Division of application No. 10/899,140, filed on Jul. 27, 2004, now Pat. No. 7,106,677, which is a division of application No. 09/826,907, filed on Apr. 6, 2001, now Pat. No. 6,785,210.

(30) Foreign Application Priority Data
Apr. 7, 2000 (JP) .............................. 2000-106639

(51) Int. Cl.
*G11B 7/00* (2006.01)
(52) U.S. Cl. ................. 369/53.22; 369/53.11; 369/124.12
(58) Field of Classification Search .............. 369/53.11, 369/53.22
See application file for complete search history.

(56) References Cited

U.S. PATENT DOCUMENTS

| | | | |
|---|---|---|---|
| 5,563,864 A | 10/1996 | Kobayashi et al. | |
| 5,617,400 A | 4/1997 | Fuji | |
| 5,781,590 A | 7/1998 | Shiokawa et al. | |
| 6,215,751 B1 | 4/2001 | Tsuchinaga | |
| 6,288,992 B1 | 9/2001 | Okumura et al. | |
| 6,339,574 B1 | 1/2002 | Kashihara | |
| 6,404,713 B1 | 6/2002 | Ueki | |
| 6,611,481 B1 | 8/2003 | Koishi et al. | |
| 6,618,337 B2 | 9/2003 | Miyashita et al. | |
| 6,847,592 B2 | 1/2005 | Okumura et al. | |

FOREIGN PATENT DOCUMENTS

| | | |
|---|---|---|
| JP | 3-165354 | 7/1991 |
| JP | 6-168451 | 6/1994 |

(Continued)

*Primary Examiner*—Wayne Young
*Assistant Examiner*—Adam R. Giesy
(74) *Attorney, Agent, or Firm*—Oblon, Spivak, McClelland, Maier & Neustadt, P.C.

(57) ABSTRACT

A reproduction signal evaluation method of this invention includes the step of obtaining a reproduction signal from an information recording medium on which digital information is recorded with record marks having different sizes, the step of obtaining the amplitude of a first reproduction signal, of the signals contained in the reproduction signal, which reflects digital information recorded with a record mark having the maximum size, the step of obtaining the amplitude of a second reproduction signal, of the signals contained in the reproduction signal, which reflects digital information recorded with a record mark having the second smallest size, the step of obtaining an evaluation value from the ratio of the amplitudes of the first and second reproduction signals, and the step of evaluating a characteristic of the reproduction signal on the basis of the evaluation value.

3 Claims, 12 Drawing Sheets

FOREIGN PATENT DOCUMENTS

| | | |
|---|---|---|
| JP | 08-329469 | 12/1996 |
| JP | 9-251676 | 9/1997 |
| JP | 10-162428 | 6/1998 |
| JP | 10-326420 | 12/1998 |
| JP | 3848049 | 10/2001 |

(a) SERIES OF SAMPLE VALUES OF EQUALIZATION SIGNAL AND SERIES OF SIGNAL VALUES SELECTED BY VITERBI DECODER (b) SIGNAL LEVEL OF SELECTED SERIES OF SIGNAL VALUES (c) DECODED DATA (a) RECORDED DATA
(b) RECORDED DATA WAVEFORM
(c) SERIES OF PITS
(d) REPRODUCTION WAVEFORM
(e) EQUALIZATION WAVEFORM
(g) DECODED DATA

REPRODUCTION SIGNAL EVALUATION METHOD

CROSS-REFERENCE TO RELATED APPLICATIONS

This application is a division of and claims the benefit of priority under 35 U.S.C. § 120 from U.S. application Ser. No. 10,899,140, filed Jul. 27, 2004, which is a divisional of U.S. application Ser. No. 09/826,907, filed Apr. 6, 2001, and is based upon and claims the benefit of priority under 35 U.S.C. § 119 from Japanese Patent Application No. 2000-106639, filed Apr. 7, 2000; the entire contents of both of which are incorporated herein by reference.

BACKGROUND OF THE INVENTION

The present invention relates to a reproduction signal evaluation method of evaluating the quality of a reproduction signal reproduced from an information recording medium on which digital information is recorded. The present invention also relates to an information recording medium on which digital information is recorded. In addition, the present invention relates to an information reproduction apparatus for reproducing digital information from an information recording medium on which digital information is recorded.

Recent years have seen a remarkable increase in the recording density of information recording media such as optical disks and magnetic disks. With this increase in recording density, the quality margin of reproduction signals read out from media by a digital recording/reproduction apparatus is reduced. For this reason, the state of each record mark on a medium must be accurately specified. In the case of exchangeable media, in particular, consideration must be given in advance to the facts that a single medium is used in a plurality of apparatuses, and a plurality of media are used in a single apparatus. Compatibility must be ensured between the media. That is, the characteristics of a reproduction signal obtained when a medium is played in a predetermined apparatus must be specified. In other words, reproduction signals must be accurately evaluated; otherwise, specifications for compatibility cannot be provided for media.

BRIEF SUMMARY OF THE INVENTION

The present invention has been made in consideration of the above situation and, has as its object to provide the following reproduction signal evaluation method, information recording medium, and information reproduction apparatus: (1) a reproduction signal evaluation method capable of accurately evaluating reproduction signals obtained by an information recording medium on which predetermined information is recorded at a high density; (2) an information recording medium on which predetermined information is recorded at a high density under a predetermined condition such that reproduction signals satisfying a predetermined evaluation condition can be obtained; and (3) an information reproduction apparatus for reproducing information from an information recording medium on which predetermined information is recorded at a high density under a predetermined condition such that reproduction signals satisfying a predetermined evaluation condition can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 10:
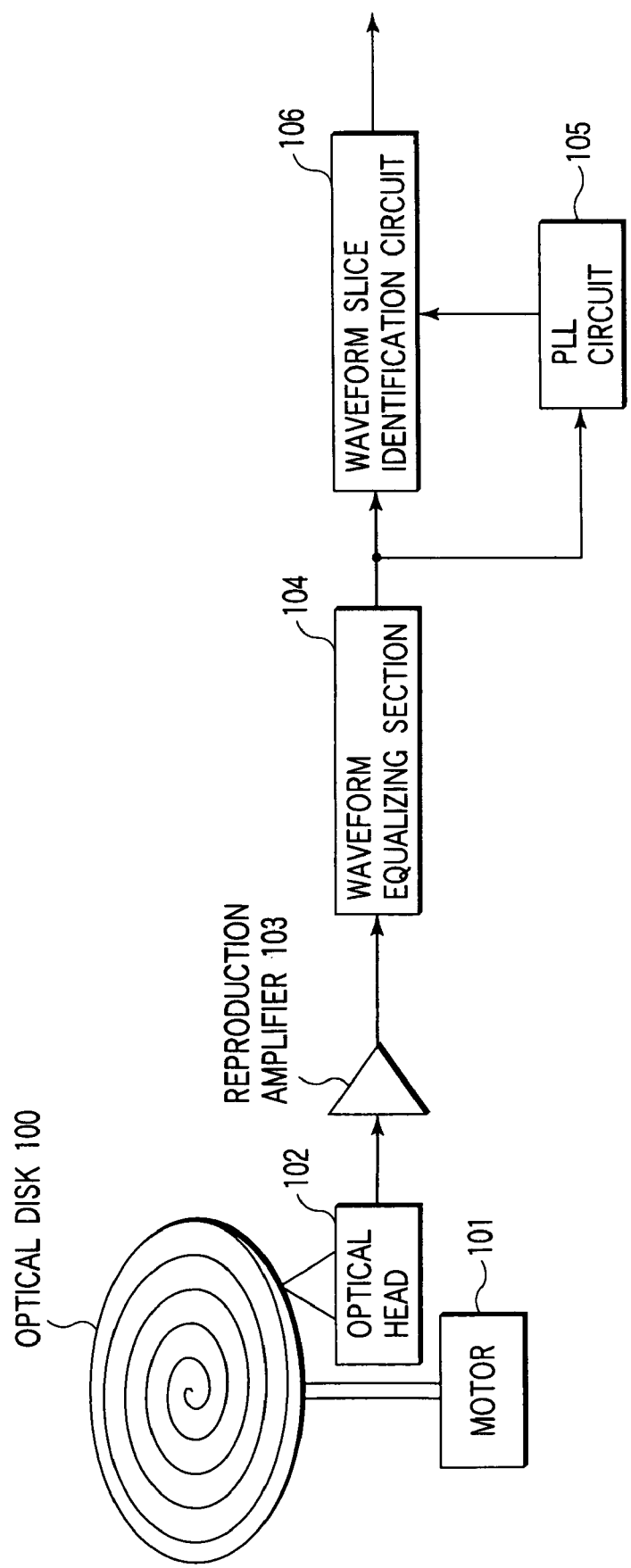
FIG. 10 is a view showing the schematic arrangement of the reproduction signal processing system of an optical disk apparatus using a level slice scheme.

An optical disk apparatus using a level slice scheme will be described first with reference to FIG. 10.

Digital data is recorded on an optical disk 100. Tracks are formed by digital data strings recorded on the optical disk 100. The optical disk 100 includes a recording/reproduction disk on which data can be written, a reproduction-only disk formed by recording data in recess/projection form on a disk surface in a manufacturing process, and a composite disk having both a recordable area and a reproduction-only area.

In the reproduction mode, the optical disk 100 is rotated by a motor 101, and an optical head 102 irradiates the rotated optical disk 100 with a laser beam. More specifically, the optical head 102 has an LD (laser diode), and the light beam emitted from the LD is focused on a record mark on a track formed on the optical disk 100 via an objective lens. Reflected light from the optical disk 100 is focused on a photodetector via a condenser lens to be converted into a reproduction signal. Note that the above record mark indicates both a mark recorded on a phase change recording layer with a change in reflectance and an embossed pit in recess/projection form.

The signal (based on the reflected light) output from the optical head 102 is amplified by a reproduction amplifier 103 and is waveform-equalized by a waveform equalizing section 104. The waveform equalizing section 104 is formed by a filter having a high frequency emphasis characteristic and the like to facilitate identification of digital data continuously recorded along a track.

To reconstruct digital data recorded on an optical disk into the original data, the reproduction signal is converted into binary data of 0 or 1, and the data contained in the reproduction signal is identified by establishing synchronization on the basis of a clock signal. No clock signal is recorded on the optical disk. For this reason, a PLL circuit 105 generates a clock signal from the reproduction signal. Meanwhile, a waveform slice identification circuit 106 outputs binary data in synchronism with the clock signal output from the PLL circuit 105. As an identification method, a waveform slice scheme of discriminating 0 from 1 with reference to the central level of the reproduction signal by using a level comparator.

The waveform slice scheme will be described with reference to FIG. 11. For example, record marks ("(c)" in FIG. 11) are formed on an optical disk in accordance with a recorded data waveform ("(b)" in FIG. 11) corresponding to recorded data ("(a)" in FIG. 11). When information (record mark) recorded on the optical disk is to be reproduced, the LD emits a reproduction light beam as a small beam spot (the round hatched portion in "(c)" in FIG. 11), and reflected light of this light beam is detected, thereby reading the record mark. That is, a reproduction signal is obtained. The waveform (reproduction waveform) of this reproduction signal is obtained as a rounded waveform like the one indicated by "(d)" in FIG. 11 instead of a rectangular waveform like the recorded data waveform indicated by "(b)" in FIG. 11.

Figure 11:
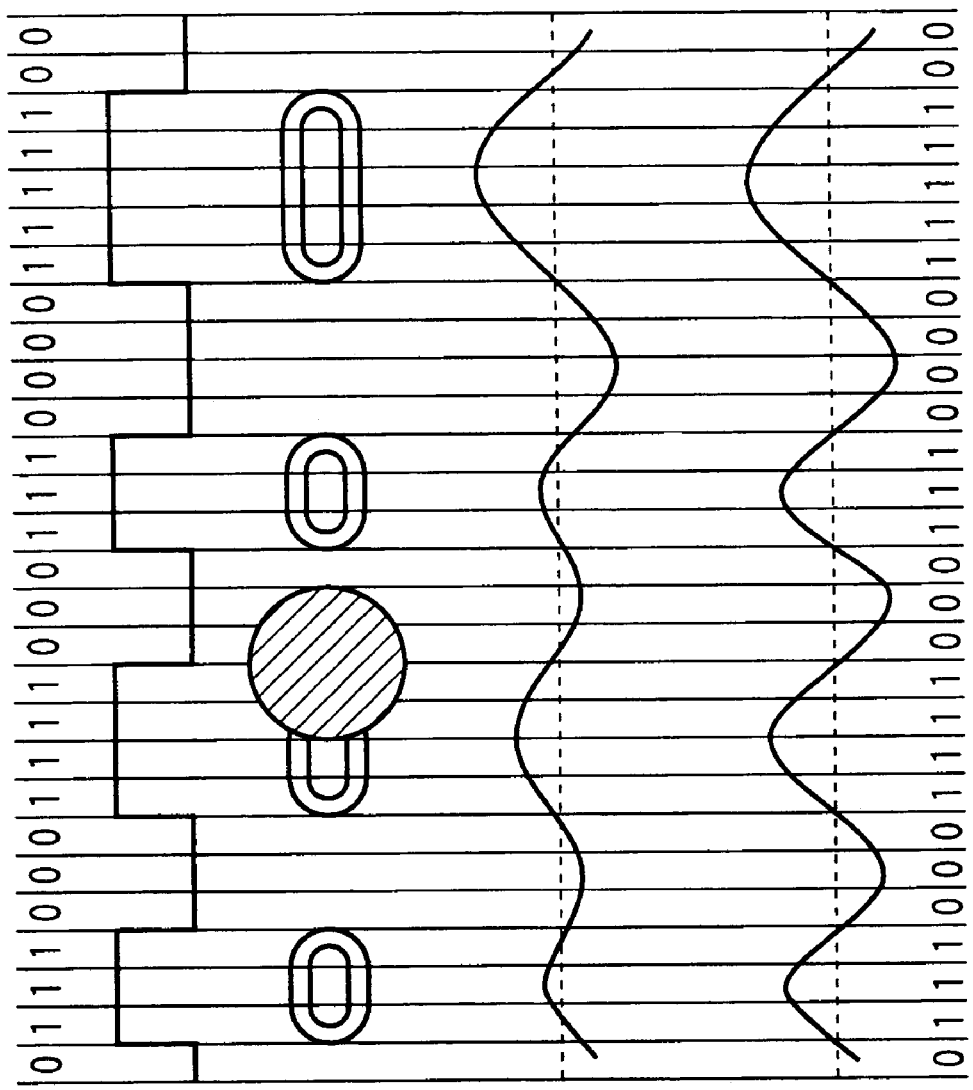
FIG. 11 is a chart showing a reproduction signal waveform and identifying operation using a level slice.

The equalizer therefore performs waveform equalization such that each intersection of an equalization waveform and a given threshold (indicated by the chain line) is located in the center of an identification point, as indicated by "(e)" in FIG. 11. More specifically, the high-frequency component of the reproduction signal is amplified. With regard to the comparison result on the equalization waveform and the threshold at each identification point, an identification unit sets "1" if the level of the equalization waveform is higher, and "0" otherwise, thereby output binary data. As a consequence, decoded data is obtained, as indicated by "(f)" in FIG. 11.

As evaluation criteria for optical disks and drives, jitter after waveform equalization, a modulation amplitude before waveform equalization, and asymmetry are used.

Figure 12:
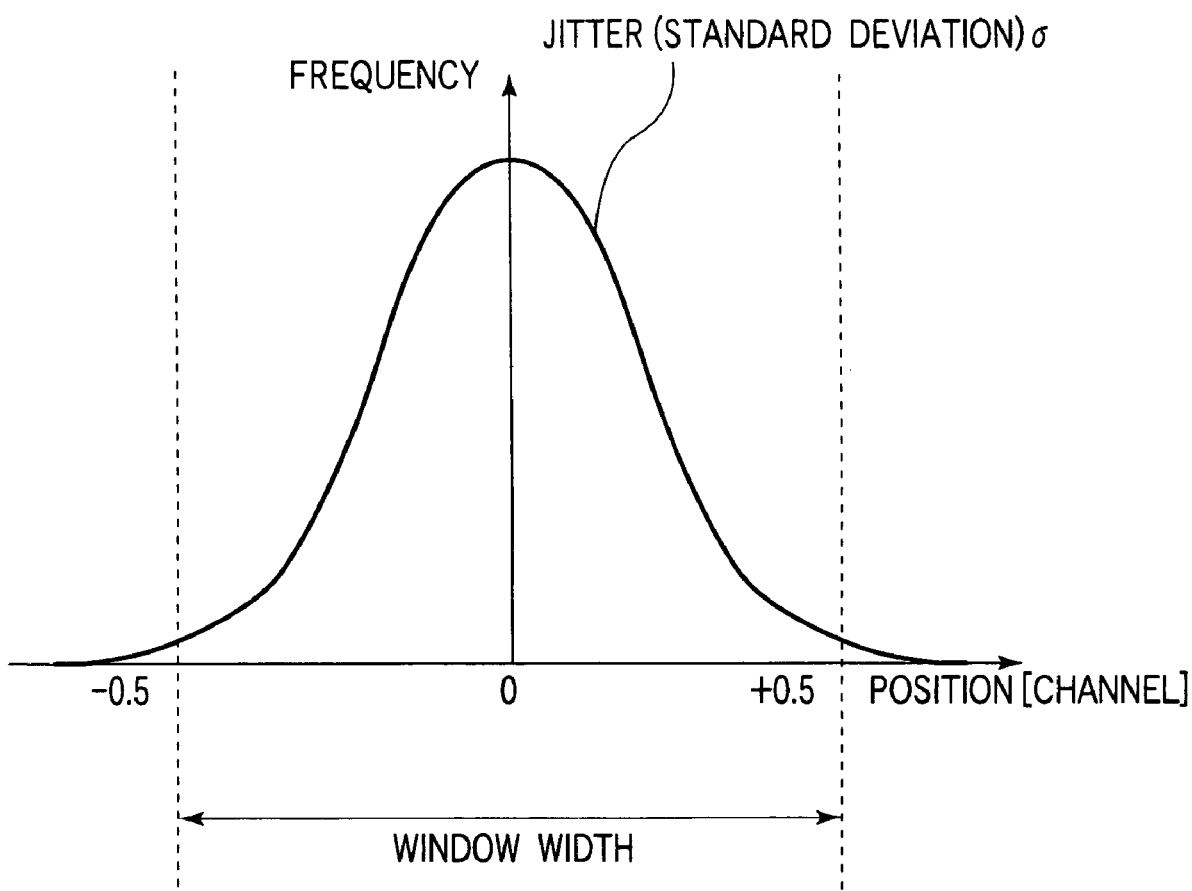
FIG. 12 is a graph showing a reproduction signal evaluation based on jitter.

A method of defining jitter will be described below. An intersection of an equalization waveform and a threshold does not necessarily coincide with the center of a window due to noise and the like. For this reason, an intersection between the equalization waveform and the threshold is distributed with respect to an identification point interval (window), as shown in FIG. 12. In this case, jitter is expressed by the standard deviation of the intersection data normalized with the window width.

Figure 13:
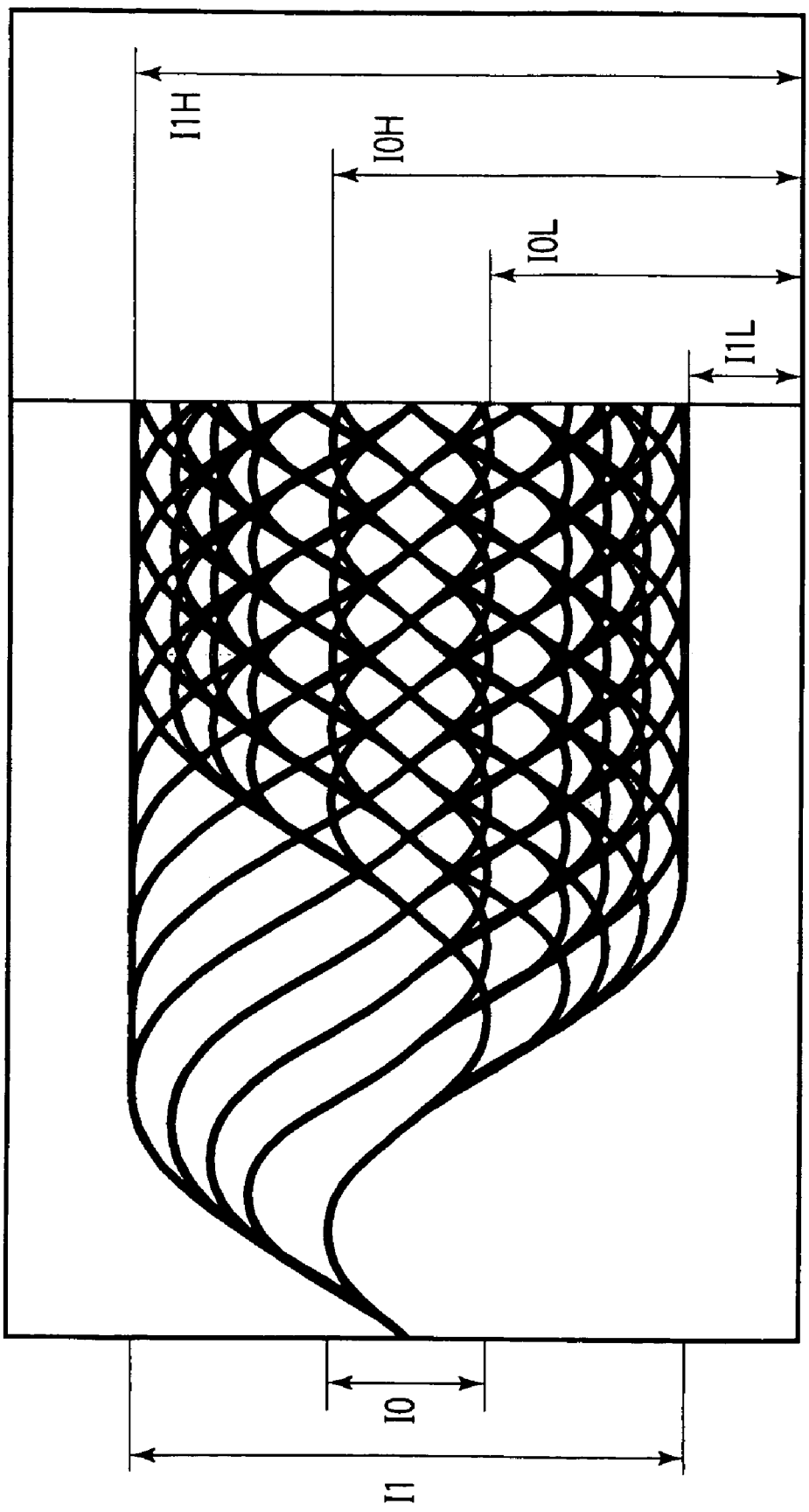
FIG. 13 is a graph showing a reproduction signal waveform in the optical disk apparatus shown in FIG. 10.

A modulation amplitude and asymmetry will be described next. Owing to the resolution characteristic (MTF), the reproduction signal based on a small record mark with a high density on an optical disk has a small amplitude, whereas the reproduction signal based on a large mark with a low density on the disk has a large amplitude. If the size of a record mark becomes equal to or larger than a size corresponding to a spot size on the optical disk, the amplitude of a reproduction signal becomes almost constant. As a consequence, reproduction signals from an optical disk on which record marks having different sizes are formed become those shown in FIG. 13.

In this case, a modulation amplitude (MA) is defined by the ratio of the amplitude of a signal with the highest density (densest signal amplitude: I0) to the amplitude of a signal with the lowest signal amplitude (coarsest signal amplitude: I1). The densest signal amplitude is the amplitude of a signal with the highest density. This signal has the shortest signal level change period and the smallest signal amplitude. The coarsest signal amplitude is the amplitude of a signal with the lowest density. This signal has the longest signal level change period and a large signal amplitude. Since signals with low densities lower than a certain density are almost equal in amplitude, such an amplitude can be considered as the maximum value of the amplitudes of all reproduction signals. A modulation amplitude can be expressed by the ratio of these two values as follows:

Asymmetry (SA) is defined by the offset amount between the central level of a densest signal and the central level of the coarsest signal. Asymmetry can be given from the low-level side (L0L) and high-level side (L0H) of a densest signal and the low-level side (L1L) and high-level side (L1H) of a coarsest signal amplitude according to:

These definition schemes properly function when an enough amplitude is ensured for a densest signal, and at the same time, a sufficiently high S/N ratio is ensured in terms of quality. In practice, even if data was identified according to a binary waveform slice, the amplitude of a densest signal could be measured as long as the error rate was sufficiently low.

As the recording density increases, however, the amplitude of a densest signal decreases, and the signal becomes difficult to identify by a binary waveform slice. In addition, adjacent data interfere witch each other to make it difficult to separate the data. These phenomena will increase the error rate, resulting in an inability to read stored data.

As a means of coping with such phenomena accompanying an increase in recording density, the PRML (Partial Response and Maximum Likelihood) scheme is available. PRML is a data identification means replacing the binary waveform slice scheme. The PRML scheme can eliminate the influence of interference between data, and even if the quality of a densest signal deteriorates to a certain degree, reproduce more likelihood data from the preceding and succeeding data.

Even if such a new means of coping with an increase in recording density is used, a decrease in the densest signal amplitude of a reproduction signal and a deterioration in quality are inevitable. Under the circumstances, accurate evaluation of a reproduction signal is difficult to perform on the basis of the definitions of a modulation amplitude and asymmetry depending on a densest signal. In addition, according to the evaluation method based on a binary waveform slice, an evaluation result cannot be properly correlated with an error rate after identification in spite of the change in identification method. This makes it impossible to correctly reflect a request in a reproduction signal from a medium.

As described above, according to the definition methods for a modulation amplitude, asymmetry, and the like in association with reproduction signals, it is difficult to accurately evaluate reproduction signals.

If the PRML scheme is used to cope with an increase in recording density, it is impossible to properly correlate an evaluation result with an error rate after identification on the basis of the definitions based on a binary waveform slice.

If a reproduction signal cannot be accurately evaluated, it is impossible to specify record marks on a recording medium to ensure compatibility. Therefore, an evaluation method exhibiting a proper relationship with an error rate after identification must be specified.

Figure 1:
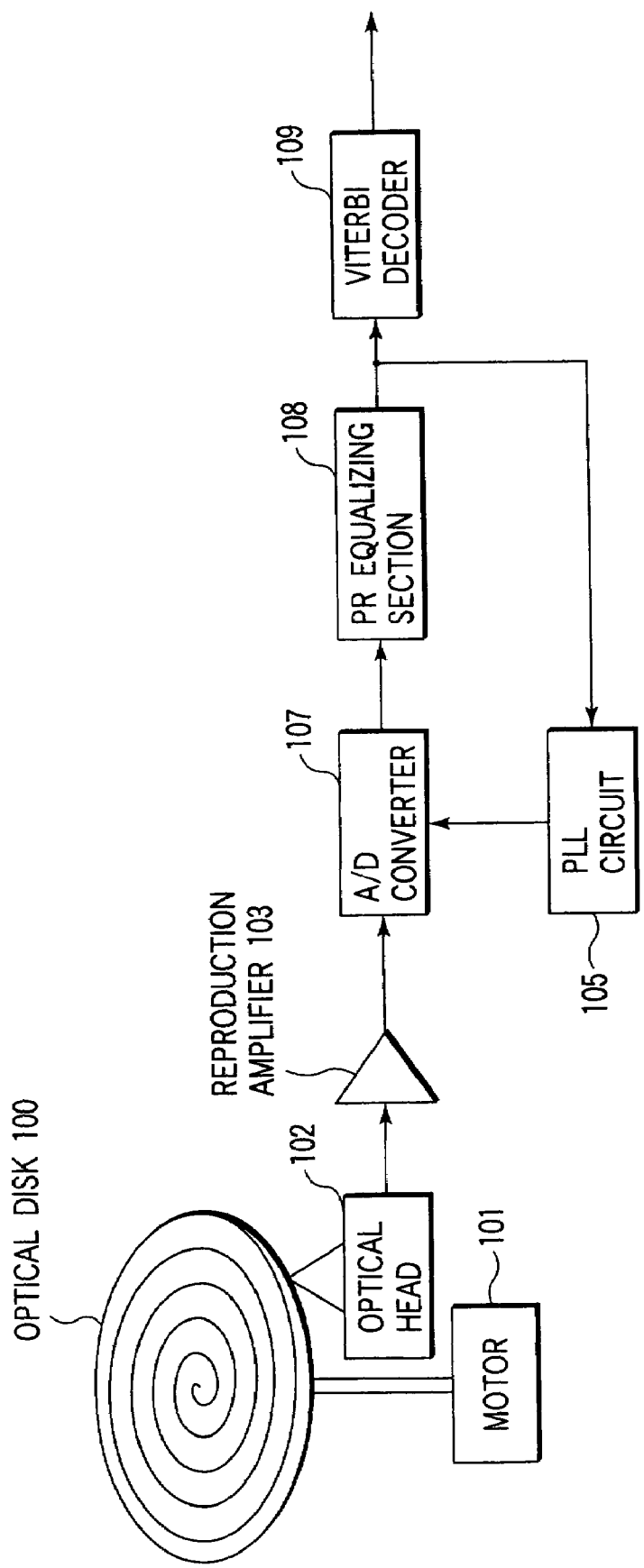
FIG. 1 is a view showing the schematic arrangement of the reproduction signal processing system of an optical disk apparatus using PRML.

FIG. 1 is a view showing reproduction signal processing in an optical disk apparatus using the PRML scheme corresponding to a high-density optical disk.

Digital data are recorded on the optical disk 100. Tracks are formed by the digital data strings recorded on the optical disk 100. The optical disk 100 includes a recording/reproduction disk on which data can be written, a reproduction-only disk formed by recording data in recess/projection form on a disk surface in a manufacturing process, and a composite disk having both a recordable area and a reproduction-only area.

In the reproduction mode, the optical disk 100 is rotated by the motor 101, and the optical head 102 irradiates the rotated optical disk 100 with a laser beam. More specifically, the optical head 102 has an LD (laser diode), and the light beam emitted from the LD is focused on a record mark on a track formed on the optical disk 100 via the objective lens. Light reflected by the optical disk 100 is focused on a photodetector via a condenser lens to be converted into a reproduction signal. Note that the above record mark indicates both a mark recorded on a phase change recording layer with a change in reflectance and an embossed pit in recess/projection form.

The signal read by the optical head 102 is amplified by the reproduction amplifier 103. The amplified signal is sampled and converted into digital data by an A/D converter 107. The clock signal used for sampling is generated by the PLL circuit 105. The PLL circuit 105 generates a clock signal from the PR-equalized reproduction signal.

The reproduction signal converted into the digital signal is PR-equalized by a PR equalizing section 108. The waveform equalizing section 104 in FIG. 10 has a high frequency emphasis characteristic to amplify a densest signal with a small amplitude so as to facilitate binary waveform slicing. In contrast to this, the PR equalizing section 108 shown in FIG. 1 has a characteristic that forms an output waveform into a waveform having undergone a predetermined specific interference pattern.

Figure 2:
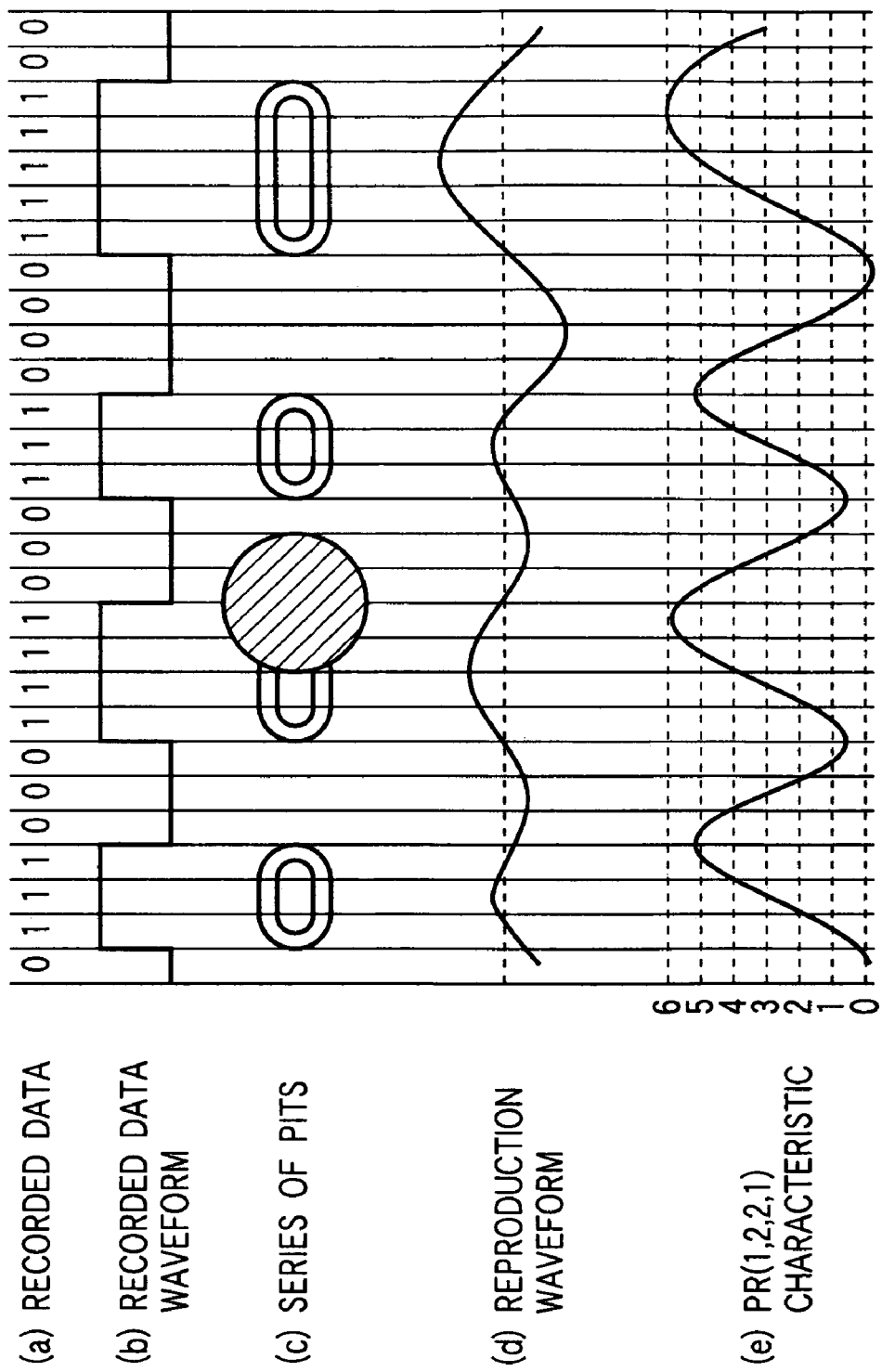
FIG. 2 is a chart showing a reproduction signal waveform and PR equalization.
Figure 3:
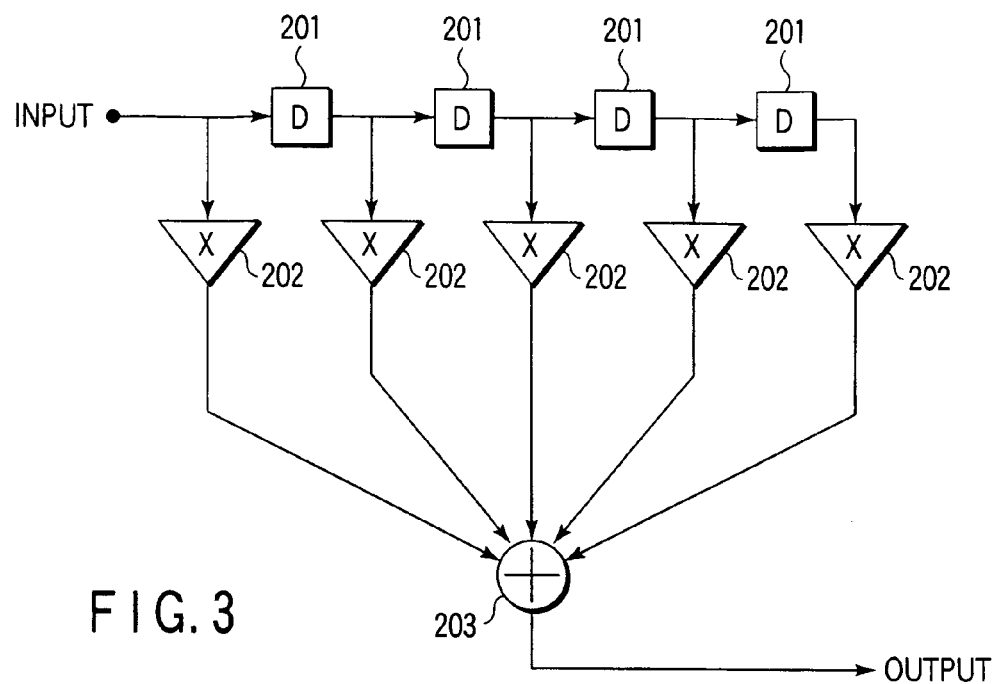
FIG. 3 is a view showing a PR equalization circuit using a transversal filter.

A reproduction signal waveform and PR equalization will be described with reference to FIG. 2. Similar to "(a)" to "(d)" in FIG. 11, "(a)" to "(d)" in FIG. 2 respectively show recorded data, recorded data waveform, record marks, and a reproduction waveform. The waveform indicated by "(e)" in FIG. 2 is obtained by equalizing the reproduction waveform indicated by "(d)" in FIG. 2 by the equalizer on the basis of the PR(1, 2, 2, 1) characteristic. The PR(1, 2, 2, 1) characteristic is a characteristic in which impulse responses appear at four continuous identification points at ratios of 1:2:2:1. Although not shown, this applies to other PR characteristics such as the PR (1, 2, 1) characteristic. In the PRML scheme, the signal deterioration caused by the equalizer can be suppressed by performing waveform equalization to the PR characteristic similar to the characteristic of the reproduction waveform actually reproduced from an optical disk. For example, as shown in FIG. 3, the PR equalizing section 108 can be formed by a transversal filter designed to multiply an output from each of cascaded delay units 201 corresponding one sampling time by a predetermined coefficient in a corresponding one of multipliers 202 and adding the resultant outputs from the respective multipliers 202 by using an adder 203.

Figure 4:
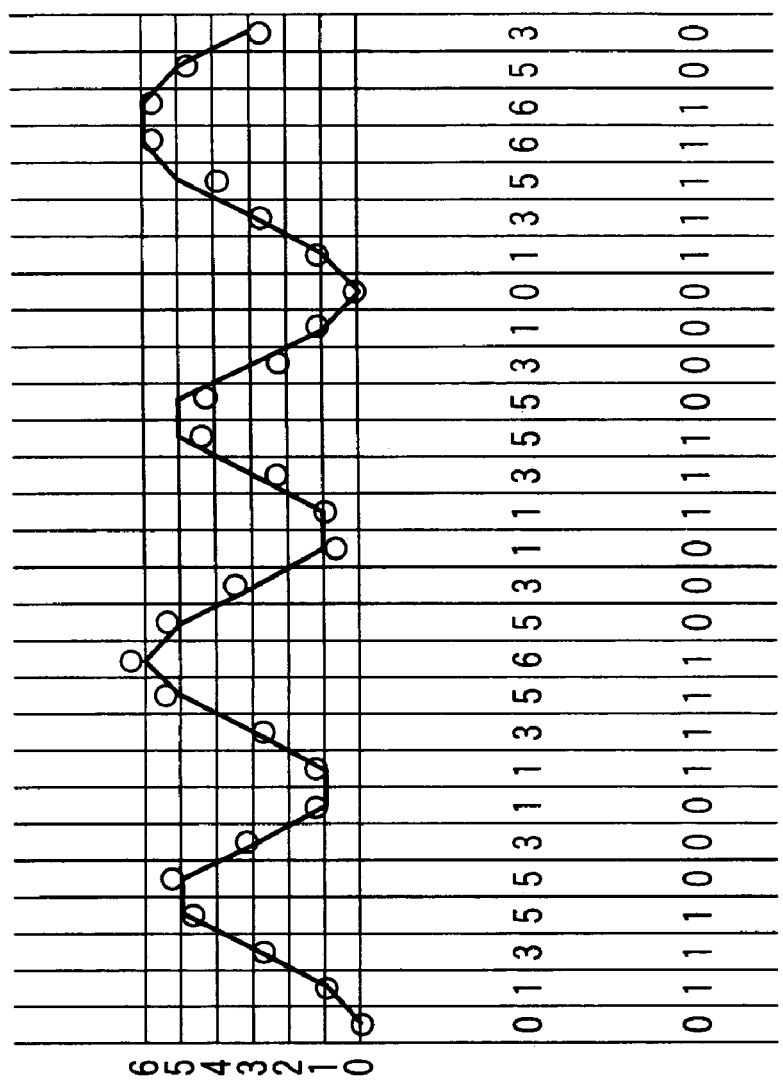
FIG. 4 is a chart showing identifying operation based on the PRML scheme.

In a reproduction signal processing system based on the PRML scheme, a viterbi decoder 109, a typical maximum likelihood decoder, is generally used as an identification unit to be placed after an equalizer. If a reproduction signal is equalized to have the PR(1, 2, 2, 1) characteristic by the PR equalizing section 108, the viterbi decoder selects a series of values, from all series of values satisfying the PR(1, 2, 2, 1) characteristic, which exhibits the minimum error from a series of sample values of an equalization waveform, and outputs binary data (decoded data) corresponding to the selected series. FIG. 4 shows this state. Referring to "(a)" in FIG. 4, the points indicated by the circles indicate a series of sample values of an equalization waveform, and the solid line connecting them indicates a series of signal values selected by the viterbi decoder. The signal level of the selected series of signal values is indicated by "(b)" in FIG. 4. The decoded data based on the PR(1, 2, 2, 1) characteristic is identified as indicated by "(c)" in FIG. 4.

In the PRML scheme, decoding is performed from a plurality of sample values instead of a single sample value, and the resultant data is identified as a maximum likelihood series of signal values. This scheme is therefore resistant to signal deterioration components having no correlation between sample values.

In an optical disk apparatus, a resolution (MTF: Modulation Transfer Function) is restricted by the characteristics of an optical system. The MTF has a characteristic that the amplitude of a reproduction signal decreases as a record mark decreases in size. As the resolution increases, smaller record marks can be reproduced. On the other hand, the resolution is limited by the wavelength of an LD to be used or the numerical aperture of an objective lens, the resolution cannot be freely increased. If, therefore, the recording density is increased under the condition of restricted resolution, the amplitude of a reproduction signal corresponding to a small record mark decreases.

Figure 5:
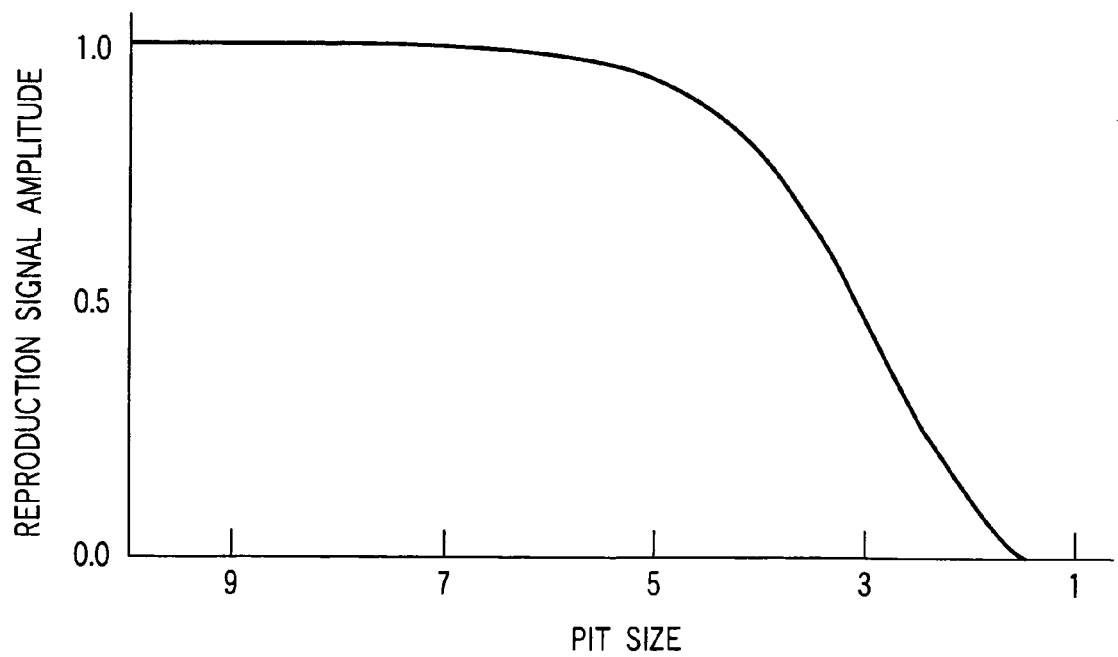
FIG. 5 is a graph showing an example of the MTF characteristic of an optical disk apparatus.

FIG. 5 shows an example of the MTF characteristics. The ordinate represents the amplitude value of a reproduction signal; and the abscissa, the size of a record mark normalized with a size of one bit. If data is recorded by RLL(1, 7) modulation, a densest mark with the highest density (with the smallest size) becomes two bits (2T), whereas a coarsest mark with the lowest density (with the largest size) becomes eight bits (8T). Therefore, a 2T reproduction signal with the highest density can acquire only a very small amplitude. With regard to an actual reproduction waveform, noise is added to this signal with the small amplitude and also influenced by interference from an adjacent signal. In addition, since the densest signal is difficult to stably record, the quality of the reproduced densest signal greatly deteriorates in quality. For this reason, it is difficult to accurately obtain a correct value according to the conventional specifications of a reproduction signal using the amplitude of a densest signal.

Figure 6:
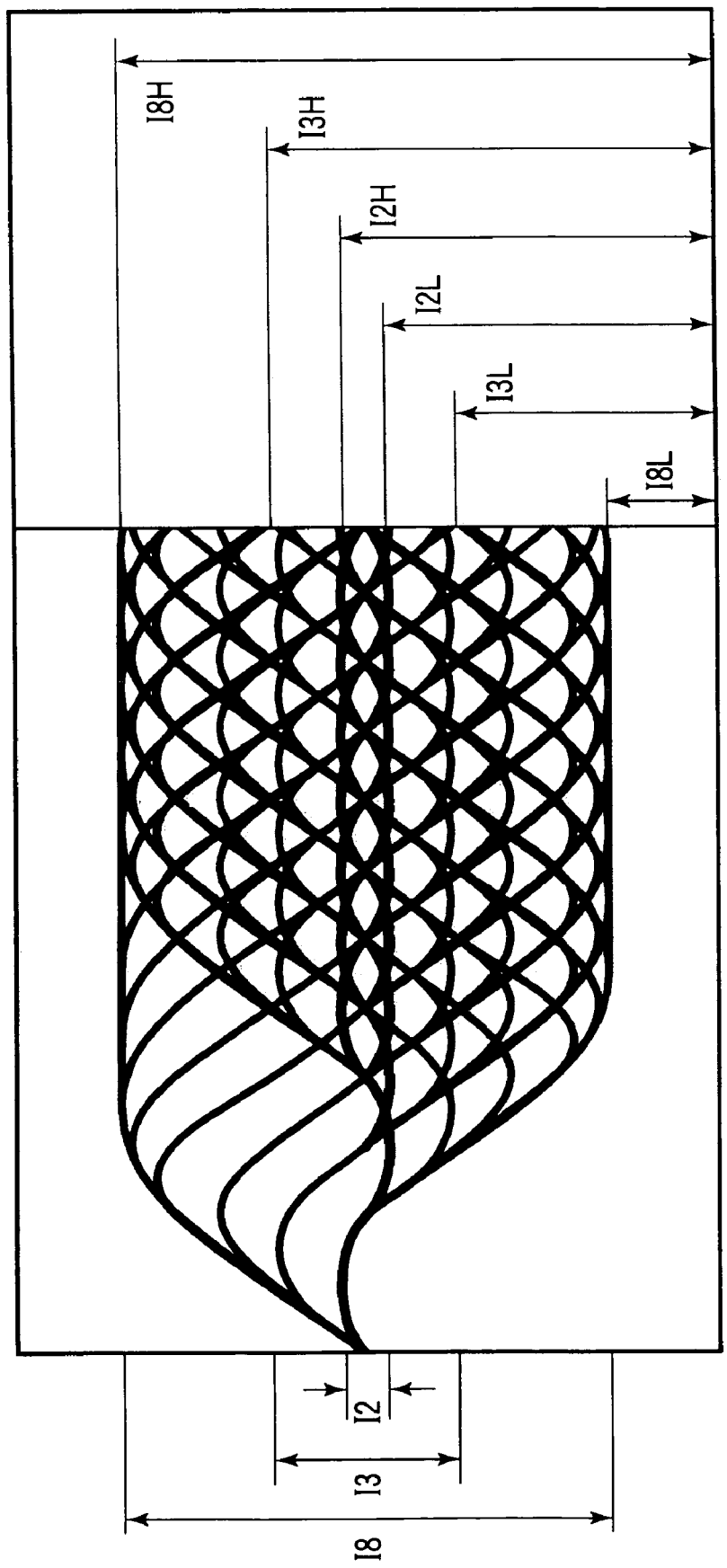
FIG. 6 is a graph showing a reproduction signal waveform in a high-density optical disk apparatus.

FIG. 6 shows an example of the reproduction signal waveform obtained when random data having undergone RLL(1, 7) modulation is recorded on a high-density optical disk. The waveform shown in FIG. 6 can be obtained by observing an output from the reproduction amplifier 103 with an oscilloscope. As is obvious from this observation result, an 8T signal with the highest density can be measured as 18 in FIG. 6 from the maximum amplitude of the measurement result. On the other hand, the amplitude of a 2T signal with the highest density seems to be I2 in FIG. 6 and is difficult to accurately measure because the signal amplitude is small and influenced by interference. Therefore, this value is inadequate to evaluate a reproduction signal from a disk.

In the case of a high-density disk in which the amplitude of a signal with the highest density becomes 20% or less (or 15% or less) of that of a signal with the lowest density, attention is paid to the amplitude of a 3T signal with the next highest density as compared with the 2T signal (i.e., a signal that reflects information recorded by forming a record mark with a size larger than that of a record mark with the smallest size by one rank). As the 3T signal amplitude indicated by "I3" in FIG. 6, a sufficient amplitude can be ensured as compared with the case of the 2T signal. This value is therefore suitable for evaluation of a high-density optical disk.

A method of evaluating a reproduction signal from a high-density optical disk by using a quasi-densest signal with the second highest density and a coarsest signal with the lowest density will be described next with reference to FIG. 6.

Modulation amplitude is an evaluation item for a reproduction signal. As the resolution of the optical system of an optical disk apparatus decreases, the MTF characteristic deteriorates. Although a decrease in resolution does not influence a signal with a low density much, the signal amplitude of a signal with a high density greatly increases. Therefore, whether the resolution of the optical system satisfies a specification or data is properly recorded on an optical disk by an apparatus having a predetermined resolution can be evaluated by comparing the amplitude of a signal with a high density with that of a signal with a low density and obtaining a modulation amplitude.

In the case of a high-density optical disk on which data is recorded by RLL(1, 7) modulation, a 3T signal amplitude (I3) with the second highest density is defined as a quasi-densest signal by using an 8T signal amplitude (I8) which is a coarsest signal having the lowest density according to the following equation. This makes it possible to stably evaluate an optical disk and reproduction signal.

Asymmetry is another evaluation item for a reproduction signal. To identify a reproduction signal, the central level of the reproduction signal must be constant regardless of the signal density. For this reason, asymmetry is added as an evaluation item. If the identification scheme used is changed from the PRML scheme because of an increase in density, the signal level corresponding to each density becomes important in addition to the central level. Therefore, asymmetry is still an important evaluation item. Asymmetry is influenced by the shapes of a mark and beam spot formed on an optical disk.

In the case of a high-density optical disk on which data is recorded by RLL(1, 7) modulation, asymmetry can be examined from the offset amount between the central level of a 3T signal which is a quasi-densest signal with the second highest density and the central level of an 8T signal which is a coarsest signal with the lowest density. More specifically, asymmetry (SA) can be defined on the basis of the low-level side (L3L) and high-level side (L3H) of the 3T signal and the low-level side (L8L) and high-level side (L8H) of the coarsest signal amplitude according to the following equation. This makes it possible to stably evaluate an optical disk and reproduction signal.

As described above, in defining a modulation amplitude and asymmetry using a densest signal, a decrease in densest signal level and deterioration in quality make it difficult to perform stable evaluation. Using a quasi-densest signal with a density lower than a densest signal makes it possible to perform stable evaluation. Although a signal with the second highest density is suitable as a quasi-densest signal, a signal with another level may be used as long as the level difference between it and a densest signal is sufficient.

Figure 8:
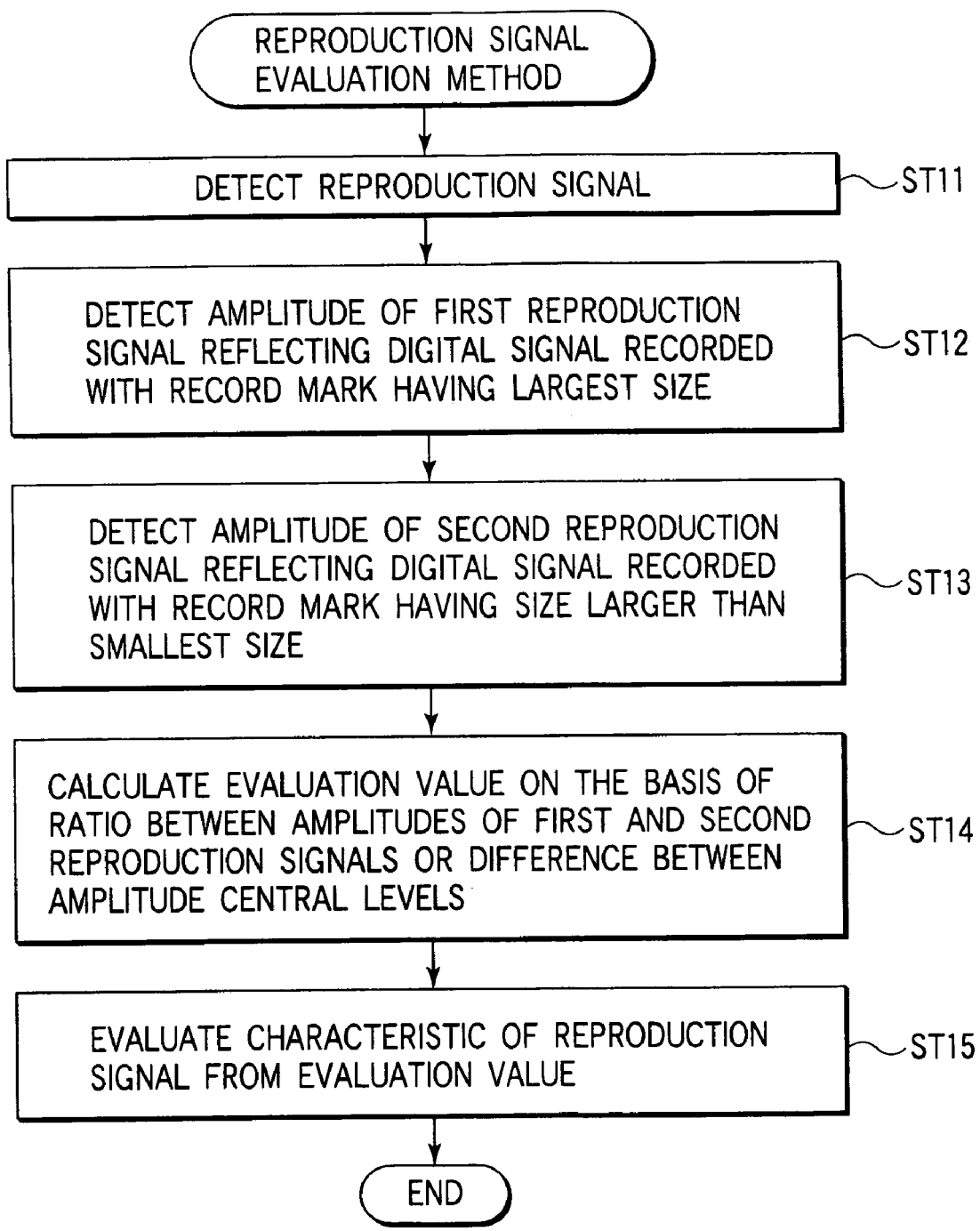
FIG. 8 is a flow chart showing an outline of a reproduction signal evaluation method using a signal before waveform equalization.

The above reproduction signal evaluation method will be summarized with reference to the flow chart of FIG. 8. As shown in FIG. 8, first of all, a reproduction signal is detected (ST11). More specifically, an information recording medium on which digital information is recorded by using record marks with various sizes is played to detect a reproduction signal reflecting the digital information. The magnitude of a first reproduction signal, of the signals included contained in the detected reproduction signal, which reflects digital information recorded by a record mark with the largest size (i.e., a reproduction signal with the lowest recording density) is obtained (ST12). In addition, the amplitude of a second reproduction signal, of the signals contained in the reproduction signal, which reflects digital information recorded by a record mark with a predetermined size, other than the record mark with the smallest size, (i.e., a reproduction signal with a predetermined recording density, other than the reproduction signal with the highest recording density) is obtained (ST13). An evaluation value is then calculated on the basis of the ratio of the amplitude of the first reproduction signal to that of the second reproduction signal or the difference between the central levels of the amplitudes (ST14). The characteristic of the reproduction signal is evaluated with this evaluation value (ST15).

In addition, by evaluating a reproduction signal using the above reproduction signal evaluation method, an information recording medium can be provided, on which digital information is recorded such that a reproduction signal that satisfies a predetermined evaluation condition can be obtained. Furthermore, an information reproduction apparatus can be provided, which reproduces a reproduction signal satisfying a predetermined evaluation condition when playing such an information recording medium. For this reason, information can be properly reproduced not only by a specific type of apparatus but also by various types of reproduction apparatuses.

The evaluation method using an output signal from a reproduction amplifier before waveform equalization has been described so far. However, evaluation can also be made by using a signal after waveform equalization. An evaluation method using a signal after waveform equalization will be described next.

Figure 7:
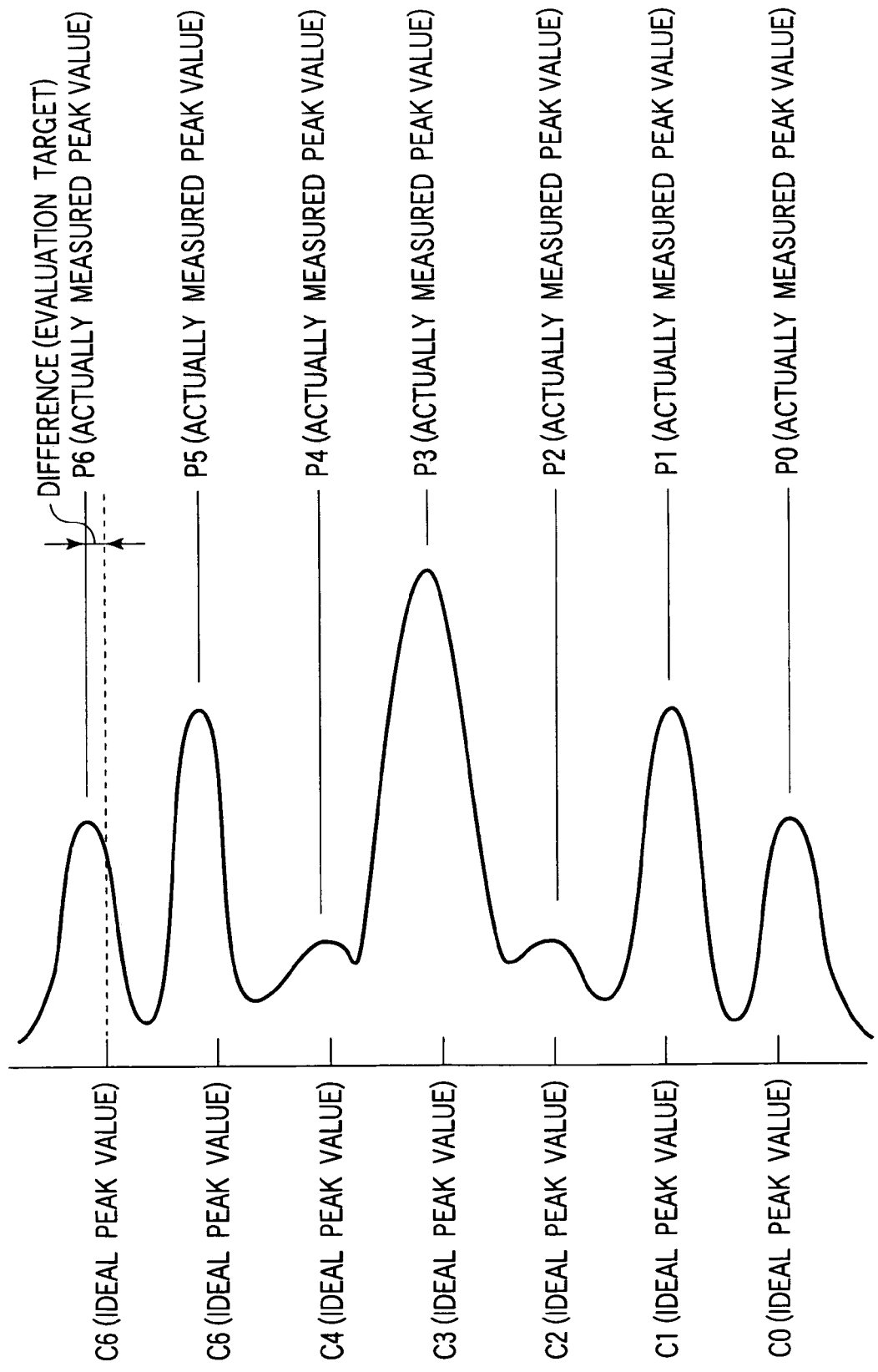
FIG. 7 is a graph showing the frequency distribution of sample values of a reproduction signal after PR equalization.

FIG. 4 shows examples of a series of signal values of a reproduction signal waveform and a series of sample values of an equalization waveform. FIG. 7 shows an example of the histogram obtained by classifying and collecting sample values after equalization in the level direction. In the case of the PR(1, 2, 2, 1) characteristic, seven distribution peaks appear. Let P0 to P6 be the values of the respective level distribution peaks. If a modulation amplitude and asymmetry are adequate and waveform equalization is properly performed, the values P0 to P6 become equal to ideal values C0 to C6 calculated from the PR(1, 2, 2, 1) characteristic. The ideal values have the following relationship because all the intervals between the adjacent level distribution peaks are equal:

If, however, an optical disk is not properly formed or an apparatus is not adequately adjusted, a modulation amplitude or asymmetry deviation occurs. As a consequence, the values of these level distribution peaks deviate from the ideal values. If the sample values deviate from the ideal values, an error occurs in the viterbi decoder in the process of calculating an optimal data series. An increase in errors for the peaks generates an identification error. Therefore, the deviations of the respective peak values from the corresponding ideal values are obtained. This makes it possible to evaluate the optical disk and reproduction signal.

Methods of obtaining evaluation values from the level distribution peaks obtained with respect to the series of sample values of the equalization waveform in FIG. 7 will be described next.

According to the first method, the differences between the respective level distribution peak values and the corresponding ideal values are obtained, and a characteristic is evaluated in accordance with the sum total of the absolute values of the differences. In this case, the signal characteristic (S1) is given by ##EQU1##

As described above, the characteristic may be evaluated by using the average value of the absolute values as well as the sum total of the absolute values.

According to the second method, the differences between the respective level distribution peak values and the corresponding ideal values are obtained, and a characteristic is evaluated on the basis of the sum total of the squares of the differences. In this case, the signal characteristic (S2) is given by ##EQU2##

As described above, the characteristic may be evaluated by using the average of the squares as well as the sum total of the squares.

The above evaluation method using an equalization waveform is effective as a relatively easy evaluation method incorporating equalizer performance. To reflect an error rate after identification in a measurement result with more likelihood, the above processing is preferably performed after assigning weights to the differences associated with the respective level distribution peaks in consideration of the properties of the signal and the identification method used. In this case, equations (6) and (7) can be modified into equations (8) and (9), letting W0 to W6 be the weighting factors assigned to the respective level distribution peaks. ##EQU3##

Examples of parameters associated with a weight factor determining method will be described next.

Consider the distributions of the respective peaks appearing in the histogram. The variances of the respective distributions are not necessarily equal to each other owing to the influences of factors that cause noise components and the frequency characteristics of waveform equalization. Even with the same deviation amounts of the respective peak values from the corresponding ideal values, the sample value at an end of a distribution with a large variance greatly differs from the ideal value. As a consequence, this distribution greatly overlaps an adjacent distribution, resulting in an increase in the possibility of an error in the identification step. Therefore, a large weighting factor is assigned to a peak with a large variance, and a small weighting factor is assigned to a peak with a small variance, thereby increasing the degree of correlation between the evaluation result and the error rate.

In addition, according to the modulation characteristics of recorded data, the occurrence frequencies of the respective level distributions are not necessary equal to each other. It is regarded that as the peaks of level distributions with a high occurrence frequency deviate, the overall error rate is influenced more. In general, recorded data is often converted into random data to eliminate a signal offset. If, therefore, a modulation scheme is determined, the actual occurrence frequency distribution can be regarded to be almost equal to the occurrence frequency distribution obtained when random data is modulated. By using the ratios of the occurrence frequencies of the respective levels with respect to random data as weighting factors, the degree of correlation between the evaluation result and the error rate can be increased.

According to the characteristics of viterbi decoding on the rear stage, the degrees of influences of deviations on errors after identification are not necessarily equal to each other depending on the signal levels. For example, in the case of the PR(1, 2, 2, 1) characteristic, even if the minimum level P0 of the equalization waveform becomes smaller than the ideal value C0 or the maximum level P6 become larger than the ideal value C6, no error easily occurs in viterbi decoding. In contrast to this, a deviation at an intermediate level such as P1, P2, P4, or P5 relatively tends to become a factor that causes an error. The degree of influence on an error after identification with consideration given to the characteristics of viterbi decoding is obtained by measuring the level of an equalization waveform when an error actually occurs. A large weighting factor is set for a level at which the degree of influence on an error is large, and vice versa. This makes it possible to increase the degree of correlation between the evaluation result and the error rate.

Each method described above is based on addition of all peaks in accordance with the number of peaks defined by the PR characteristic. Alternatively, to simplify the above processing, addition may be performed for only some peaks, and the resultant value may be used as a typical evaluation value. Obviously, comprehensive weighting factors may be finally determined by combining the degrees of influence on these parameters.

Addition is performed after level distribution peaks are obtained from the histogram obtained by classifying and collecting sample values of an equalization waveform in the level direction and assigning weights to the differences between the respective peak values and the corresponding ideal values. With this operation, as compared with the case where evaluation is performed with an error rate after identification, evaluation can be performed more easily with a proper correlation with the error rate including equalizer performance.

Figure 9:
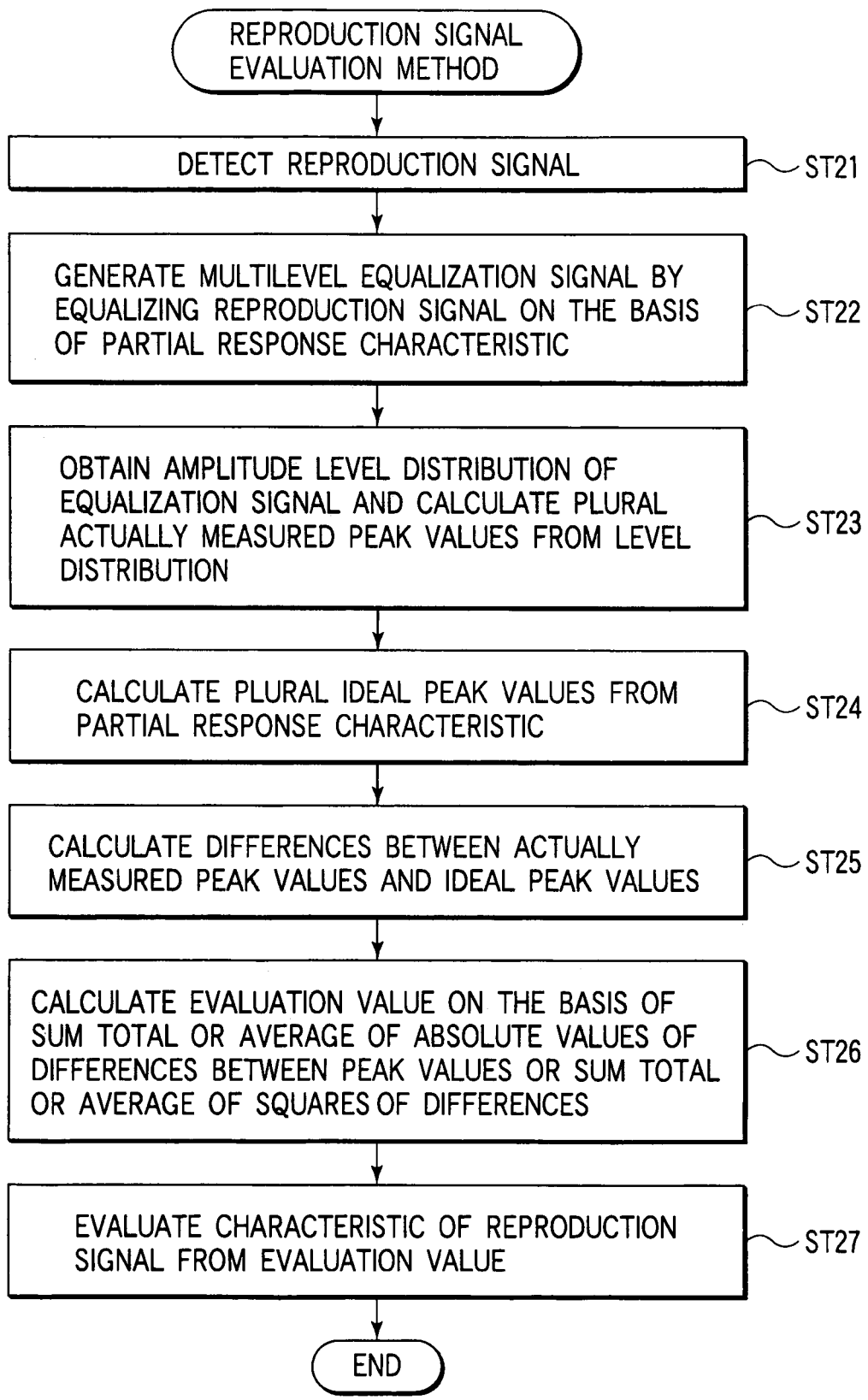
FIG. 9 is a flow chart showing an outline of a reproduction signal evaluation method using a signal after waveform equalization.

The above reproduction signal evaluation method will be summarized with reference to the flow chart of FIG. 9. As shown in FIG. 9, first of all, a reproduction signal is detected (ST21). More specifically, an information recording medium on which digital information is recorded by using record marks with various sizes is played by an optical means, and a reproduction signal reflecting the digital information is detected. The detected reproduction signal is equalized on the basis of a predetermined partial response characteristic to generate a multilevel equalization signal (ST22). The amplitude level distribution of the equalization signal is then obtained, and a plurality of actually measured peak values are calculated from this level distribution (ST23). A plurality of ideal peak values are calculated from the predetermined partial response characteristic (ST24). The differences between the respective actually measured peak values and the corresponding ideal values are obtained (ST25). An evaluation value is calculated on the basis of the sum total or average of the absolute values of the differences between the respective peak values or the sum total or average of the squares of the differences (ST26). The characteristic of the reproduction signal is evaluated by this evaluation value (ST27).

In addition, by evaluating a reproduction signal using the above reproduction signal evaluation method, an information recording medium can be provided, on which digital information is recorded such that a reproduction signal that satisfies a predetermined evaluation condition can be obtained. Furthermore, an information reproduction apparatus can be provided, which reproduces a reproduction signal satisfying a predetermined evaluation condition when playing such an information recording medium. For this reason, information can be properly reproduced not only by a specific type of apparatus but also by various types of reproduction apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. A reproduction signal evaluation method comprising:
   a first step of playing an information recording medium on which digital information is recorded with record marks having various sizes by using optical means, and obtaining a reproduction signal reflecting the digital information;
   a second step of obtaining a first reproduction signal, of signals contained in the reproduction signal, which reflects digital information recorded with a record mark having a largest size;
   a third step of obtaining a second reproduction signal, of signals contained in the reproduction signal, which reflects digital information recorded with a record mark having a predetermined size other than a record mark having a smallest size;
   a fourth step of obtaining an evaluation value on the basis of the first and second reproduction signals; and
   a fifth step of evaluating a characteristic of the reproduction signal on the basis of the evaluation value;
   wherein the second step comprises obtaining an amplitude central level of the first reproduction signal,
   the third step comprises obtaining an amplitude central level of the second reproduction signal, and
   the fourth step comprises obtaining an evaluation value based on a value calculated by dividing a difference between the amplitude central levels of the first and second reproduction signals by a difference between a high level and a low level of the first reproduction signal.

2. An information recording medium on which digital information is recorded such that a reproduction signal satisfying a predetermined evaluation condition is obtained when the reproduction signal is evaluated by a reproduction signal evaluation method comprising:
   a first step of playing an information recording medium on which digital information is recorded with record marks having various sizes by using optical means, and obtaining a reproduction signal reflecting the digital information;
   a second step of obtaining a first reproduction signal, of signals contained in the reproduction signal, which reflects digital information recorded with a record mark having a largest size;
   a third step of obtaining a second reproduction signal, of signals contained in the reproduction signal, which reflects digital information recorded with a record mark having a predetermined size other than a record mark having a smallest size;
   a fourth step of obtaining an evaluation value on the basis of the first and second reproduction signals; and
   a fifth step of evaluating a characteristic of the reproduction signal on the basis of the evaluation value;
   wherein the second step comprises obtaining an amplitude central level of the first reproduction signal,
   the third step comprises obtaining an amplitude central level of the second reproduction signal,
   the fourth step comprises obtaining an evaluation value based on a value calculated by dividing a difference between the amplitude central levels of the first and second reproduction signals by a difference between a high level and a low level of the first reproduction signal, and
   digital information is recorded such that a reproduction signal satisfying the predetermined evaluation condition is obtained when the reproduction signal is evaluated by the reproduction signal evaluation method.

3. An information reproduction apparatus for reproducing a reproduction signal satisfying a predetermined evaluation reference from an information recording medium on which digital information is recorded such that a reproduction signal satisfying a predetermined evaluation condition is obtained when the reproduction signal is evaluated by a reproduction signal evaluation method comprising:
   a first step of playing an information recording medium on which digital information is recorded with record marks having various sizes by using optical means, and obtaining a reproduction signal reflecting the digital information;
   a second step of obtaining a first reproduction signal, of signals contained in the reproduction signal, which reflects digital information recorded with a record mark having a largest size;
   a third step of obtaining a second reproduction signal, of signals contained in the reproduction signal, which reflects digital information recorded with a record mark having a predetermined size other than a record mark having a smallest size;
   a fourth step of obtaining an evaluation value on the basis of the first and second reproduction signals; and
   a fifth step of evaluating a characteristic of the reproduction signal on the basis of the evaluation value;
   wherein the second step comprises obtaining an amplitude central level of the first reproduction signal,
   the third step comprises obtaining an amplitude central level of the second reproduction signal,
   the fourth step comprises obtaining an evaluation value based on a value calculated by dividing a difference between the amplitude central levels of the first and second reproduction signals by a difference between a high level and a low level of the first reproduction signal, and
   a reproduction signal satisfying a predetermined evaluation reference is reproduced from an information recording medium on which digital information is recorded such that a reproduction signal satisfying a predetermined evaluation condition is obtained when the reproduction signal is evaluated by the reproduction signal evaluation method.

* * * * *